United States Patent [19]

Kautz

[11] Patent Number: 4,591,861
[45] Date of Patent: May 27, 1986

[54] DOPPLER VOR

[75] Inventor: Werner Kautz, Korntal, Fed. Rep. of Germany

[73] Assignee: International Standard Electric Corporation, New York, N.Y.

[21] Appl. No.: 589,970

[22] Filed: Mar. 15, 1984

[30] Foreign Application Priority Data

Mar. 18, 1983 [DE] Fed. Rep. of Germany ....... 3309784

[51] Int. Cl.$^4$ .................................. G01S 1/44
[52] U.S. Cl. .................... 343/404; 343/405; 343/406
[58] Field of Search .................... 343/401–406, 343/368, 371–373, 369–370

[56] References Cited

U.S. PATENT DOCUMENTS

| | | | |
|---|---|---|---|
| 3,787,861 | 1/1974 | Becavin et al. | 343/405 |
| 4,005,427 | 1/1977 | Höfgen | 343/406 |
| 4,017,860 | 4/1977 | Earp | 343/405 |
| 4,123,759 | 10/1978 | Hines et al. | 343/371 |
| 4,203,114 | 5/1980 | Gerst et al. | 343/373 |

*Primary Examiner*—Theodore M. Blum
*Assistant Examiner*—B. E. Gregory
*Attorney, Agent, or Firm*—John T. O'Halloran

[57] ABSTRACT

In a doppler VOR, a plurality of antennas (1) are arranged equidistantly on a circle (20). Two opposite antenna pairs on the circle are simultaneously activated by a commutator (13) in a manner to simulate as uniform a rotation of two opposite antennas as possible. Reciprocal power dividers (12) are disposed in the lines (15) between the commutator and the antennas. They couple out a given portion of the transmitter signal and transfer it to the two next antennas but one (I, V) in relation to an active antenna (III). These two antennas (I, V), the active antenna (III), and the two intermediate antennas (II, IV), which act as parasitic elements, form an antenna group. Since two adjacent antennas are active simultaneously, two antenna groups are active simultaneously. Their radiation patterns are approximately elliptical. The portion of the extracted energy and the phase shift produced by the RF lines are so chosen that a user—due to the superposition of the two elliptical radiation patterns—sees an approximately circular radiation pattern in all spatial directions.

1 Claim, 3 Drawing Figures

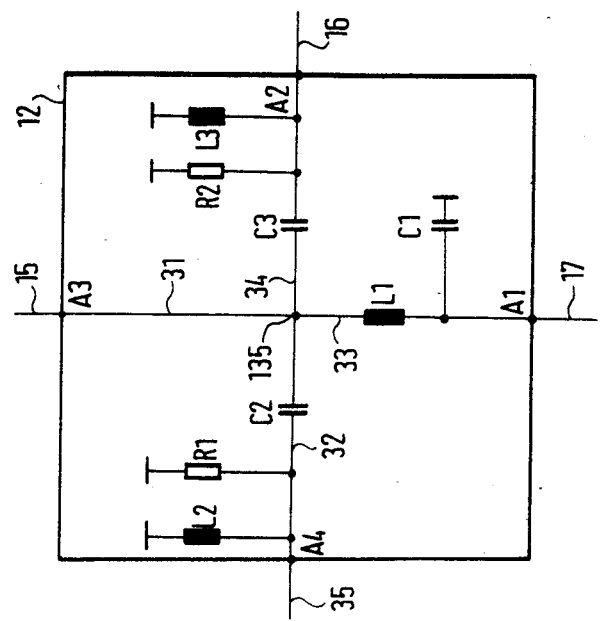
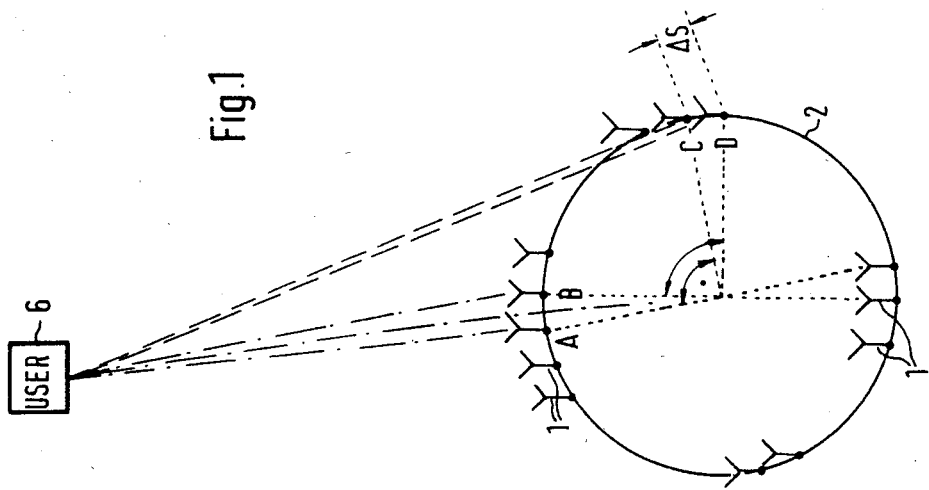

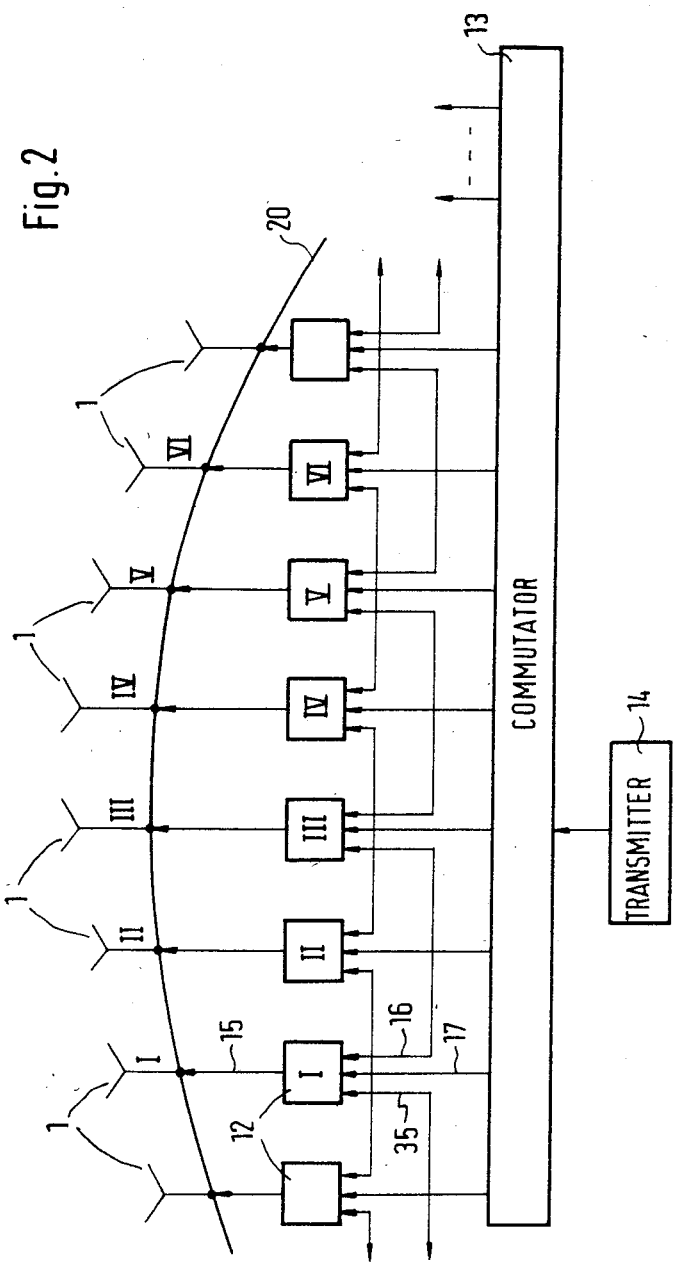

DOPPLER VOR

The present invention relates to a doppler very high frequency omnidirectional range (doppler VOR) as set forth in the preamble of claim 1.

Doppler VORs are disclosed in the book "Funksysteme für Ortung und Navigation", Verlag Berliner Union GmbH, Stuttgart 1973, pp. 139–145. An antenna array for such a doppler VOR is described in DE-OS No. 30 27 451. That array is designed to provide optimum isolation between adjacent antennas. To this end, reciprocal power dividers are disposed in the lines between the commutator ("antenna switching device") of the doppler VOR and the antennas arranged on a circle, and adjacent power dividers are interconnected by RF lines. With the solution described there, good isolation is obtained only if there is a mismatch from the antenna via the power divider and the commutator toward the transmitter.

In a double-sideband doppler VOR, two opposite antennas on the circle must be activated simultaneously. One of them radiates the upper sideband of the carrier wave, and the other the lower sideband. To simulate as uniform a rotation of an active antenna as possible, not only two opposite antennas but two opposite pairs of antennas (or, if necessary, groups of even more antennas) are usually activated simultaneously. The signals fed to the adjacent antennas are intensity-modulated in such a way that the simulated rotation is as uniform as possible.

It turned out that, while the desired omnidirectional pattern is obtained with a double-sideband doppler VOR having an antenna array as disclosed in the above-cited DE-OS, undesired amplitude modulation of the signal used for navigation occurs, the frequency of that modulation being equal to twice the rotation rate of a pair of antennas.

The object of the invention is to provide a doppler VOR wherein spurious modulation is kept to a minimum. In the novel doppler VOR, spurious modulation lies far below the maximum permissible value. By choosing suitable division ratios for the power dividers, good isolation is provided not only between adjacent antennas but also between antennas spaced further apart. This also applies to the central antenna required in a doppler VOR.

An embodiment of the invention will now be explained in more detail with reference to the accompanying drawings, in which:

FIG. 1 is a sketch illustrating the cause of the spurious modulation;

FIG. 2 is a block diagram of a part of the novel doppler VOR, and

FIG. 3 is a block diagram of a power divider.

In the sketch of FIG. 1, a plurality of antennas 1 are arranged on a circle 2. At any given instant (as is usual with double-sideband doppler VORs), two opposite antenna pairs on the circle are active.

In the description, an antenna pair will be called "active" even if, due to the intensity modulation, one antenna of a pair is fed with maximum intensity, and the other with "zero intensity".

The signals radiated by the omnidirectional antennas A, B require the same time to travel to a user 6 looking in a direction perpendicular to the circle 2. Thus, in the direction of the user 6, the radiation patterns of the antennas of a pair are superposed on each other and in phase. The situation is different if, to simulate the rotation of antenna pairs, the antennas C, D, separated from the previously active antennas A, B on the circle 2 by 90°, are active. The signals radiated by the antennas C, D have different transit times to the user 6 (difference $\Delta s$), which results in the superposed radiation patterns of the antennas C and D differing in phase. Due to the different superpositions of patterns, the signal received by the user has different amplitudes depending on whether it was radiated by the antenna pair A, B or the antenna pair C, D. The same applies analogously to the antenna pairs opposite those pairs. Consequently, the signal received by the user is amplitude-modulated at twice the rotation rate of the antenna.

In the novel doppler VOR, which will now be explained with the aid of FIG. 2, this amplitude modulation is at least greatly reduced.

FIG. 2 shows only those parts which are necessary to understand the invention. The generation of the carrier and sideband signals and the intensity modulation of the sideband signals will not be dealt with.

A double-sideband doppler VOR always has an even number of antennas on the circle. If these antennas are consecutively numbered, they can be divided into a group with even ordinal numbers and a group with odd ordinal numbers.

Six of the antennas on the arc 20 are consecutively numbered with Roman numerals I to VI. The other antennas of the doppler VOR are not further designated or not shown. Each of the six antennas is connected to a commutator 13 through a reciprocal power divider 12. The commutator controls the activation of the antenna in a manner known per se. It is connected to a transmitter 14.

Each of the reciprocal power dividers 12 has four terminals one of which is connected to the associated antenna by an RF line 15, and one of which is connected to the commutator by an RF line 17. The two remaining terminals are connected to the next reciprocal power dividers but one by RF lines 35, 16, i.e., power dividers associated with even-numbered antennas, e.g., IV, are connected to the power dividers associated with the antennas having the next-higher and next-lower even ordinal numbers, VI and II. The same applies analogously to the odd-numbered power dividers and antennas.

As was stated above, optimum isolation between adjacent antennas is achieved by choosing suitable division ratios for the reciprocal power dividers. Nearly perfect isolation requires, however, that a portion of the transmitting power be coupled from the antenna in the middle to the antennas located on the left and the right thereof. The lengths of the RF lines between a power divider and the two next power dividers but one are chosen on the basis of the lengths of the nonexistent RF lines between adjacent power dividers, which lines would be required to provide optimum isolation between adjacent antennas. This length is equal to that of the (nonexistent) RF line required to achieve optimum isolation plus an integral multiple of $2\pi$ (due to physical length) plus an additional phase shift of $\pi/4$.

Thus, a transmitter signal is radiated not only by one antenna 1, e.g., by the odd-numbered antenna III, but also (with less power) by the adjacent odd-numbered antennas I and V. In addition, the intermediate even-numbered antennas II and IV act as parasitic elements because of their imperfect isolation from the directly fed antenna III. The signal is thus radiated by an antenna group formed by the antennas I to V.

Simultaneously with the odd-numbered antenna III, the adjacent even-numbered antenna IV is active. What was said about the antenna III applies analogously to the antenna IV. The signal is again radiated by an antenna group; in this case, the group consists of the antennas II to VI.

The same applies analogously to the antenna pair located opposite the antenna pair III, IV on the other side of the . circle.

The two antenna groups have elliptical radiation patterns, with the major axes of the ellipses being tangents to the circle. The amount of energy reaching the respective next antennas but one and the lengths of the RF lines (and, hence the phase shift produced) are so chosen that for a user, the radiation pattern resulting from the superposition of the two ellipses approximates optimally to a circular radiation pattern regardless of the user's position and of the position of an antenna pair on the circle. If the superposition is viewed from a user (FIG. 1:6) in a direction perpendicular to the circle, the two radiation patterns are in phase; in other directions, they differ in phase because of different signal transit times.

A power divider will now be explained in more detail with the aid of FIG. 3. Lines 31, 32, 33, 34 run from the terminals to a common node 135 in the power divider 12. Inserted in the lines 32 and 34, which are connected to the terminals A4 and A2, are capacitors C2 and C3, respectively. The values of these capacitors determine the division ratio of the power divider.

A resistor R1 between the line 32 and ground, a resistor R2 between the line 34 and ground, an inductor L1 in the line 33, an inductor L2 between the line 32 and ground, an inductor L3 between the line 34 and ground, and a capacitor C1 between the line 33 and ground serve to match the impedances of the terminals.

The output impedance of the transmitter is 50 ohms. C2 and C3 have 27 pF, and R1 and R2 have 50 ohms. L1 and C1 are chosen so that the node 135 has an impedance of 50 ohms as seen from the transmitter, and an impedance of about 15 ohms as seen from the antenna. L2 and L3 each have 0.1 uH.

It is important that there be a mismatch when looking from the antenna to the transmitter, i.e., that the power-divider terminal A3, which is connected to the antenna C, not be matched to the antenna. As a result of this mismatch, only little secondary excitation of the antenna takes place, whereby isolation between adjacent antennas is achieved.

I claim:

1. Doppler very high frequency omnidirectional range comprising at least a transmitter (14), a commutator (13), a central antenna, and a plurality of omnidirectional antennas (1) arranged equidistantly on a circle, the commutator activating the antennas in a manner to simulate the rotation of two opposite antennas around the circle, and as uniform a rotation as possible being simulated by additionally activating at least one of the two antennas adjacent to said two opposite antennas, and further comprising four-terminal reciprocal power dividers (12) connected between the commutator and each of the antennas and each having two of its terminals connected to the commutator and to one of the antennas (III), respectively, characterized in that the two remaining terminals of the power dividers are connected to the respective next antennas but one (I, V) by RF lines (16, 35), and that the division ratio of the power divider and the lengths of the RF lines over which a portion of the transmitter signal assigned to an antenna (III) is fed to the respective next antennas but one (I, V) are chosen so that the radiation patterns of the antenna group formed by a first active antenna (III) and the two adjacent antennas on both sides thereof (I, II, IV, V) and of the antenna group formed by the second active antenna (IV) adjacent to the first active antenna (III) and by the two adjacent antennas (II, III, V, VI) on both sides of said second antenna are substantially elliptical, and that for a user, the superposition of said two approximately elliptical radiation patterns gives an approximately circular radiation pattern regardless of the user's direction relative to the very high frequency omnidirectional range.

* * * * *